US008321890B2

(12) United States Patent
Murakami (10) Patent No.: US 8,321,890 B2
(45) Date of Patent: Nov. 27, 2012

(54) DEVICE AND TERMINAL FOR INSERTING COMMERCIAL IMAGE DATA IN DISTRIBUTION CONTENT AND METHOD THEREOF

(75) Inventor: Tomoko Murakami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 545 days.

(21) Appl. No.: 12/564,278

(22) Filed: Sep. 22, 2009

(65) Prior Publication Data

US 2010/0242065 A1    Sep. 23, 2010

(30) Foreign Application Priority Data

Mar. 17, 2009    (JP) .................................. 2009-64202

(51) Int. Cl.
*H04N 7/10* (2006.01)
*H04N 7/025* (2006.01)
*G06Q 30/00* (2012.01)

(52) U.S. Cl. ........... 725/36; 725/32; 725/34; 705/14.49; 705/14.53; 705/14.55; 705/14.66; 705/14.67

(58) Field of Classification Search .................... 725/34, 725/32, 36; 705/14.49, 14.53, 14.55, 14.66, 705/14.67
See application file for complete search history.

(56) References Cited

U.S. PATENT DOCUMENTS

| | | | |
|---|---|---|---|
| 7,305,691 B2 * | 12/2007 | Cristofalo ....................... | 725/34 |
| 2007/0073646 A1 * | 3/2007 | Uchibe et al. ..................... | 707/2 |
| 2008/0060000 A1 * | 3/2008 | Drouet et al. .................... | 725/34 |
| 2009/0007171 A1 * | 1/2009 | Casey et al. ..................... | 725/34 |
| 2009/0125936 A1 * | 5/2009 | Kulasekaran et al. ........... | 725/32 |
| 2010/0083304 A1 * | 4/2010 | Pan .................................. | 725/34 |
| 2010/0094878 A1 * | 4/2010 | Soroca et al. .................. | 707/748 |
| 2011/0088060 A1 * | 4/2011 | Knee et al. ....................... | 725/34 |

FOREIGN PATENT DOCUMENTS

JP    2008-022298    *    1/2008

* cited by examiner

*Primary Examiner* — Hoang-Vu A Nguyen-Ba (74) *Attorney, Agent, or Firm* — Turocy & Watson, LLP (57) ABSTRACT

A content distribution device includes a first receiver which receives, from the broadcasting station, the program content having the commercial image data and electronic program information; an commercial extractor which extracts the commercial image data and creates commercial metadata based on the electronic program information; a first storage which stores the commercial image data and the commercial metadata that are associated with each other; a second storage which stores distribution contents; a content selector which selects the distribution content according to a request from the view terminal from the second storage; a third receiver which receives, from the viewer terminal, viewing history information of program contents; an commercial inserter which selects the commercial metadata from the first storage based on the viewing history information and inserts the commercial image data corresponding to the selected commercial metadata in the distribution content; and a distribution unit which distributes the distribution content to the viewer terminal.

9 Claims, 10 Drawing Sheets

VIEWING HISTORY INFORMATION

| VIEWING DATA | VIEWING HOUR | TITLE | BROADCATING STATION | PERFORMERS | GENRES | KEYWORDS | PROGRAM INFORMATION |
|---|---|---|---|---|---|---|---|
| 2008/12/1 | 20-21 | KING'S BRANCH | 25 | A, B | INFORMATION /GOSSIP SHOW | SPRING, FASHION, GOURMET, MOVIE | THE LATEST TREND INFORMATION WILL BE DELIVERED TO YOU IN THE NOON HOURS ON THE WEEKEND! |
| 2008/12/3 | 21-22 | PARTNER GUY | 32 | C, D E | DRAMA | MARRIAGE, FRAUD, MARRIAGE MEETING, MURDER, POLICE, SEA, COTTAGE | ONE DAY, HE DARED TO VISIT HER HOUSE WHAT HE SAW THERE IS... |
| 2008/12/3 | 8-9 | GOOD INFORMATION | 45 | A, F, G, H | INFORMATION /GOSSIP SHOW | ENTERTAINMENT, MARRIAGE, DIVORCE, TAX EVASION, MARIJUANA, SUMO | LET'S START YOUR MORNING WITH THIS PROGRAM. YOU WILL HAVE FRESH AND GOOD INFORMATION. |
| 2008/12/3 | 13-14 | MARRIAGE STORY | 17 | E, I, J, K | INFORMATION /GOSSIP SHOW | CEREMONIAL HALL, MARRIAGE, MANNER, MARRIAGE HUNTING, BETROTHAL, GIFT, GREETING | VARIOUS GUESTS OPEN UP SECRET EPISODES OF MARRIAGE |

DEVICE AND TERMINAL FOR INSERTING COMMERCIAL IMAGE DATA IN DISTRIBUTION CONTENT AND METHOD THEREOF

CROSS REFERENCE TO RELATED APPLICATIONS

This application is based upon and claims the benefit of priority from the prior Japanese Patent Application No. 2009-64202, filed on Mar. 17, 2009, the entire contents of which are incorporated herein by reference.

BACKGROUND OF THE INVENTION

1. Field of the Invention

The present invention relates to a content distribution device, a content distribution method, a viewer terminal, and a content reproduction method, and relates to an commercial insertion method for distributing, through the Internet, content having commercials inserted therein, for example.

2. Related Art

In recent years, the viewer rate of TV (television) programs broadcasted in real time has been decreasing while the viewer rate of the downloaded content and content on the Internet has been increasing. In many TV broadcast programs, commercial spots and commercial rates are set corresponding to the expected viewer rate of the program, and commercials (CM) provided by program sponsors are inserted in the program. However, the effect of the commercials is questioned since the commercials are distributed through real-time television broadcasting but they are not distributed through the Internet. Therefore, JP-A 2008-22298 (Kokai) discloses, the following system to insert commercials in the content distributed through the Internet.

In this system, a terminal of a content production company, a terminal of an commercial agency or an advertiser, and a terminal and an image distribution server of an image distributor are connected to one another through a network. As in the television broadcasting, the commercial spots and commercial rates are set for each content. The commercial agency purchases the commercial spot from the image distributor in accordance with the conditions specified by the advertiser, and the image distribution server of the image distributor distributes, to the viewer terminal, content having the commercial image data inserted in the commercial spot purchased by the advertiser. As stated above, JP-A 2008-22298 (Kokai) provides a system to trade, with the advertiser, commercials of content distributed through the Internet over the image distribution server, and a system to distribute, to the viewer, the content having commercials inserted therein.

However, a great deal of time and effort are required for the image distributor, the advertiser, and the commercial attorney when the system of JP-A 2008-22298 (Kokai) is used to insert commercials in the content. This is because the image distribution server of the image distributor has to acquire the commercial image data from the terminal of the commercial agency, and the advertiser and the commercial agency have to previously specify, to the image distributor, the conditions of the commercial to be inserted and distributed.

SUMMARY OF THE INVENTION

According to an aspect of the present invention, there is provided with a content distribution device for communicating, through a network, with a viewer terminal which views program content having commercial image data inserted therein, the program content serving as a broadcast program broadcasted by a broadcasting station. The content distribution device includes a first receiver, an commercial extractor, a first storage, a second storage, a second receiver, a content selector, a third receiver, an commercial inserter and a distribution unit. The first receiver receives, from the broadcasting station, a broadcast signal including the program content having the commercial image data inserted therein and electronic program information of the program content. The commercial extractor extracts the commercial image data from the program content, and creates commercial metadata including a performer, genre, and title of the program content based on the electronic program information. The first storage stores the commercial image data and the commercial metadata. The commercial image data is associated with the commercial metadata. The second storage stores distribution contents each of which is image content to be distributed to the viewer terminal through the network. The second receiver receives a content distribution request from the viewer terminal. The content selector selects the distribution content specified by the content distribution request from the second storage. The third receiver receives, from the viewer terminal, viewing history information of the viewer terminal, the viewing history information including a performer, genre, and title of program contents which have been viewed through the viewer terminal. The commercial inserter selects the commercial metadata from the first storage based on the viewing history information and insert the commercial image data corresponding to a selected commercial metadata in the distribution content selected by the content selector. The distribution unit distributes the distribution content having the commercial image data inserted therein to the viewer terminal.

According to an aspect of the present invention, there is provided with a viewer terminal which views program content having commercial image data inserted therein serving as a broadcast program broadcasted by a broadcasting station and creates and accumulates viewing history information including a performer, genre, and title of program contents which have been viewed. The viewer terminal includes a first receiver, an commercial extractor, a first storage, a distribution request unit, an commercial inserter, and a content reproduction unit. The first receiver receives a broadcast signal from the broadcasting station, the broadcast signal including the program content having the commercial image data inserted therein and electronic program information of the program content. The commercial extractor extracts the commercial image data from the program content and creates commercial metadata including a performer, genre, and title of the program content based on the electronic program information. The first storage stores the commercial image data and the commercial metadata. The commercial image data is associated with the commercial metadata. The distribution request unit transmit a content distribution request via a network to a content delivery device configured to manage distribution of distribution contents each of which is image content to be distributed through the network and obtain the distribution content specified by the content distribution request from the content delivery device. The commercial inserter selects the commercial metadata from the first storage based on the viewing history information and inserts the commercial image data corresponding to a selected commercial metadata in the distribution content obtained by the distribution request unit. The content reproduction unit reproduces the distribution content having the commercial image data inserted therein.

DETAILED DESCRIPTION OF THE INVENTION

Embodiments according to the present invention will now be explained with reference to the accompanying drawings.

First Embodiment

Figure 1:
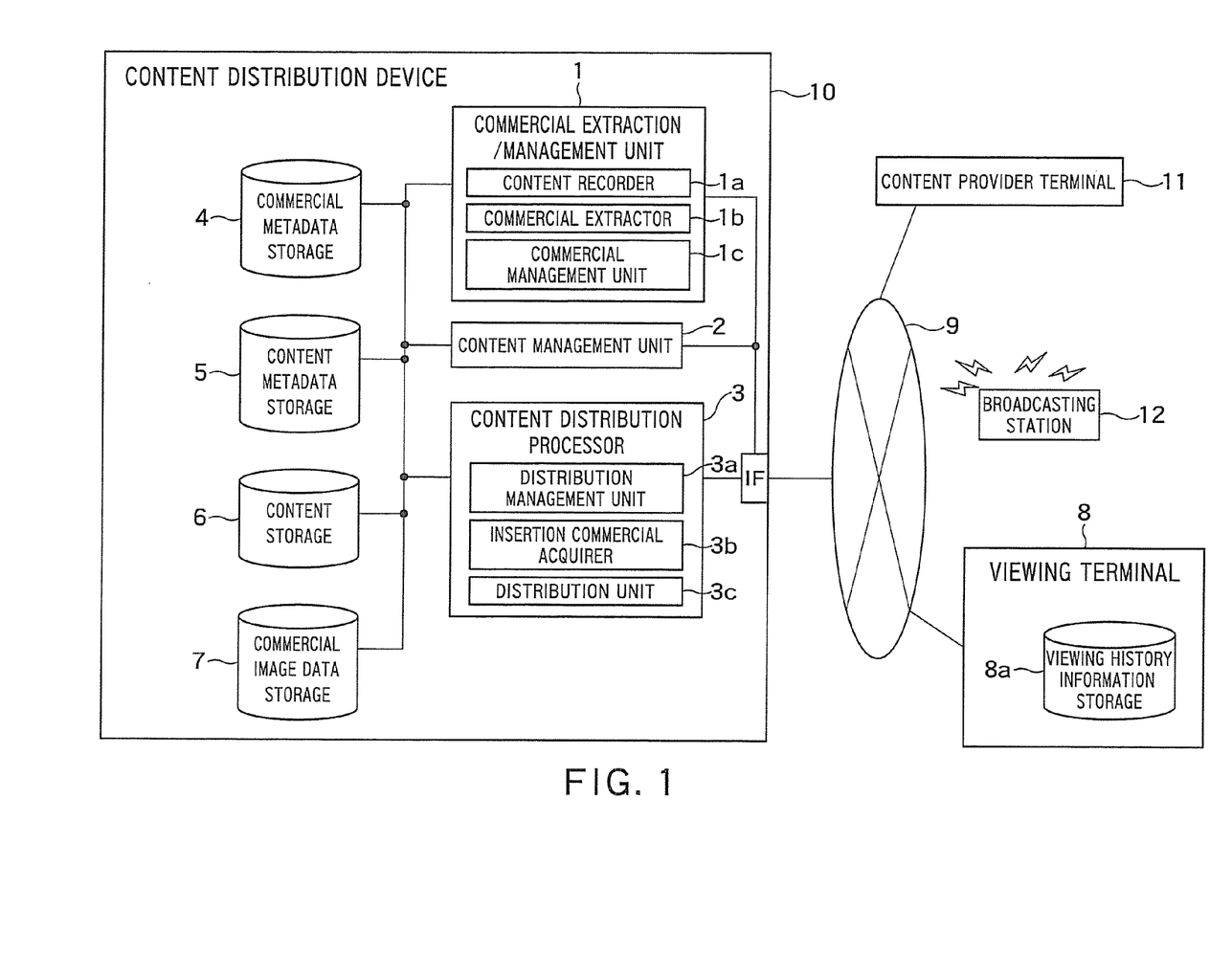
FIG. 1 is an overall block diagram showing a content distribution base including a content distribution device according to a first embodiment of the present invention.

FIG. 1 is an overall block diagram showing a content distribution base including a content distribution device according to a first embodiment of the present invention.

The content distribution base of FIG. 1 includes: a broadcasting station 12 for broadcasting program content which has commercial images inserted therein and serves as a broadcast program (image program) such as a television program; a content distribution device 10; a content provider terminal 11; and a viewer terminal 8. The content distribution device 10, the content provider terminal 11 and the viewer terminal 8 being connected to one another through a network 9 such as the Internet.

The broadcasting station 12 transmits, through broadcast waves, a broadcast signal including program content, commercial image data inserted (embedded) in the program content, and electronic program information of the television program. The broadcast signal may further includes closed caption data (see FIG. 7, which will be explained later) in which textual information of the voice used in the program content and progress information of the television program are described with time information. The program content may be formed of only images, and may be formed of images and audio. Although the program content which will be explained hereinafter is formed of images and audio, the present invention can be applied to the case where audio is not included in the program content.

The content provider terminal 11 provides the content distribution device 10 with distribution content, which is image content to be distributed to the viewer terminal 8, and the metadata (content metadata) of the distribution content. The distribution content may be formed of only images, and may be formed of images and audio. Although the distribution content which will be explained hereinafter is formed of images and audio, the present invention can be applied to the case where audio is not included in the distribution content.

The content distribution device 10 receives a content distribution request from the viewer terminal 8, selects the commercial image data to be inserted in the distribution content specified by the request, inserts the selected commercial image data in the distribution content specified by the request, and distributes the distribution content through the network 9.

The viewer terminal 8 transmits the content distribution request to the content distribution device 10, and receives and views (reproduces) the distribution content specified by the content distribution request with the commercial image data being inserted in the distribution content. Further, the viewer terminal 8 receives a broadcast signal including a television program (program content having commercial images inserted therein) broadcasted by the broadcasting station 12 and electronic program information, and views the program content having commercial images inserted therein. Furthermore, the viewer terminal 8 generates viewing history information of the viewed program content (see FIG. 8, which will be explained later) by using the electronic program information, and stores the generated viewing history information in a viewing history information storage 8a.

Hereinafter, the content distribution device 10 will be explained in detail.

The content distribution device 10 of FIG. 1 includes: a content storage 6 for storing the distribution content, which is the image content to be distributed to the viewer terminal 8 through the network 9; a content metadata storage 5 for storing the metadata of the distribution content; a content management unit 2 for managing the content storage 6 and the content metadata storage 5; an commercial image data storage 7 for storing the commercial image data to be inserted in the distribution content; an commercial metadata storage 4 for storing the commercial metadata, which is the metadata of the commercial image data; an commercial extraction/management unit 1 for managing the commercial image data storage 7 and the commercial metadata storage 4; and a content distribution processor 3 which receives a content distribution request from the viewer terminal 8, inserts the commercial image data selected by a technique which will be explained later in the distribution content specified by the request, and distributes the distribution content to the viewer terminal 8. The commercial extraction/management unit 1, the content management unit 2, and the content distribution processor 3 are connected to the network 9 through a communication interface IF.

Figure 3:
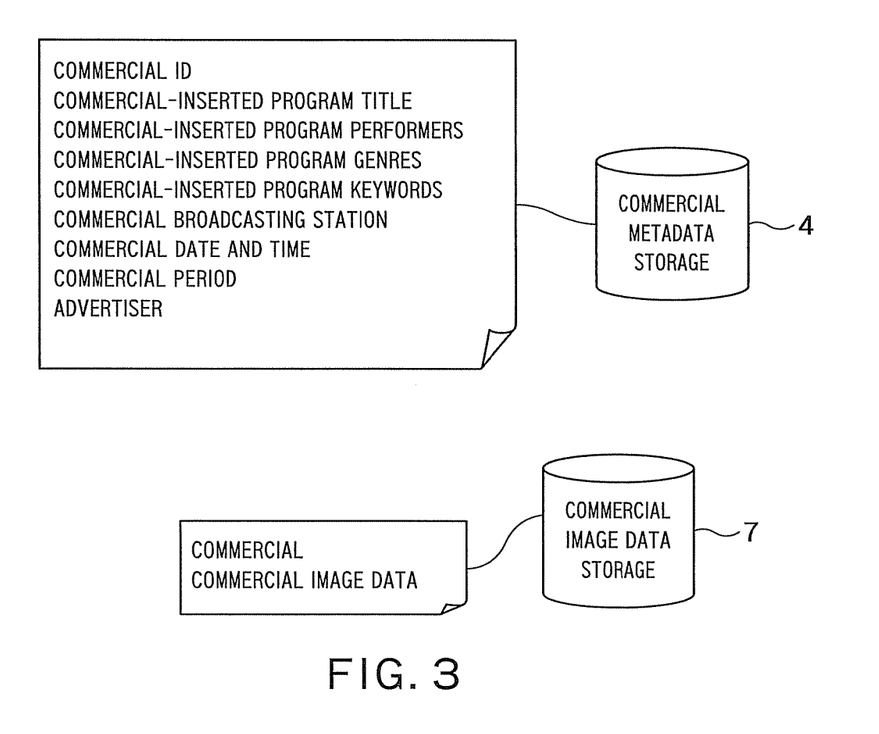
FIG. 3 is a diagram showing a structural example of the data stored in an commercial metadata storage and an commercial image data storage.
Figure 4:
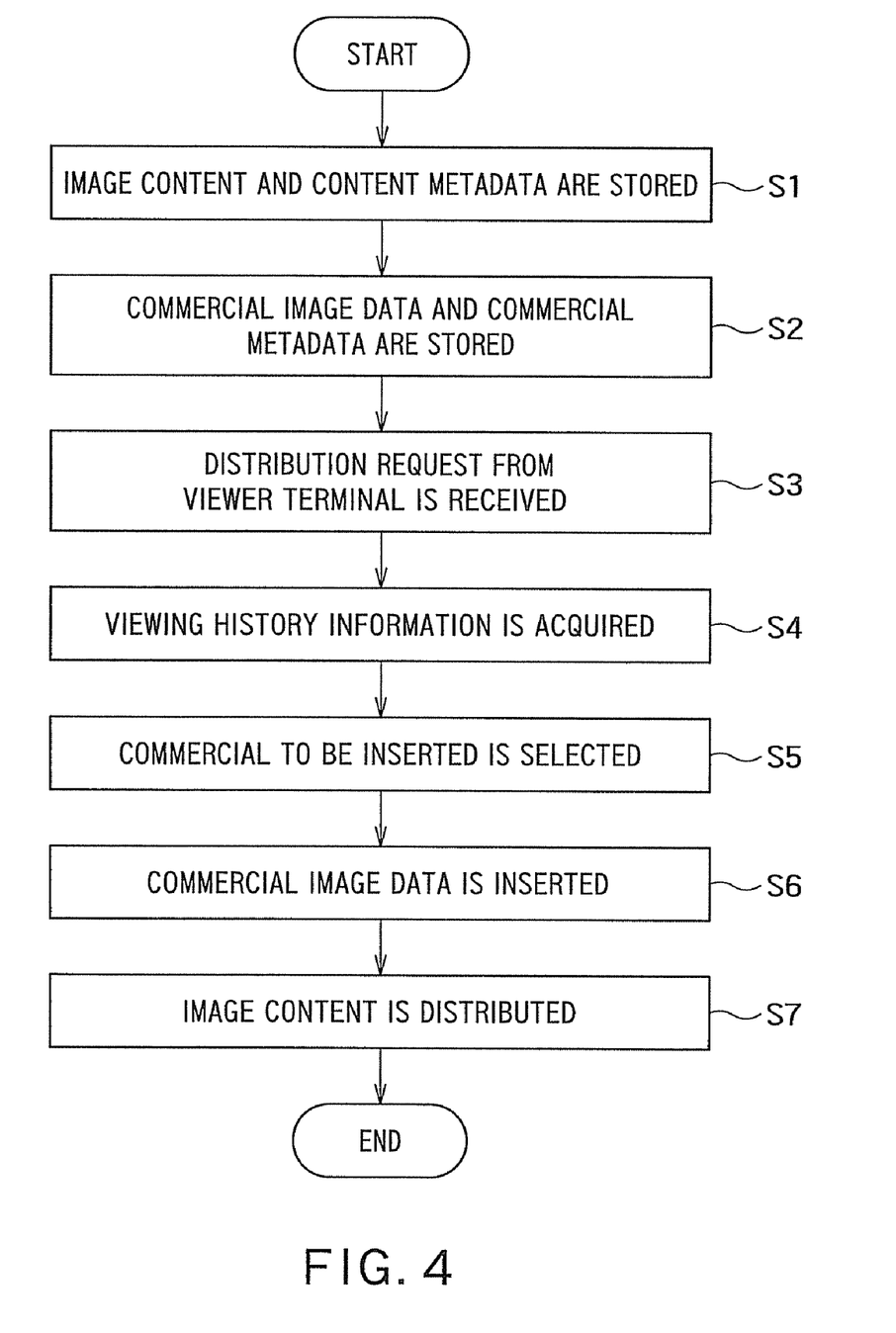
FIG. 4 is a flow diagram showing a process performed by the content distribution device of FIG. 1.

FIG. 4 is a flow chart showing a process performed by the content distribution device 10 of FIG. 1. Hereinafter, the operation of the content distribution device 10 will be explained in detail referring to this flow chart while using FIGS. 2, 3, and 5 to 9.

In step S1, the content management unit 2 acquires the distribution content and content metadata from the content provider terminal 11 through the network 9, and stores the acquired distribution content and content metadata in the content storage 6 and the content metadata storage 5, respectively. The content storage 6 corresponds to a second storage of the present invention, for example.

Figure 5:
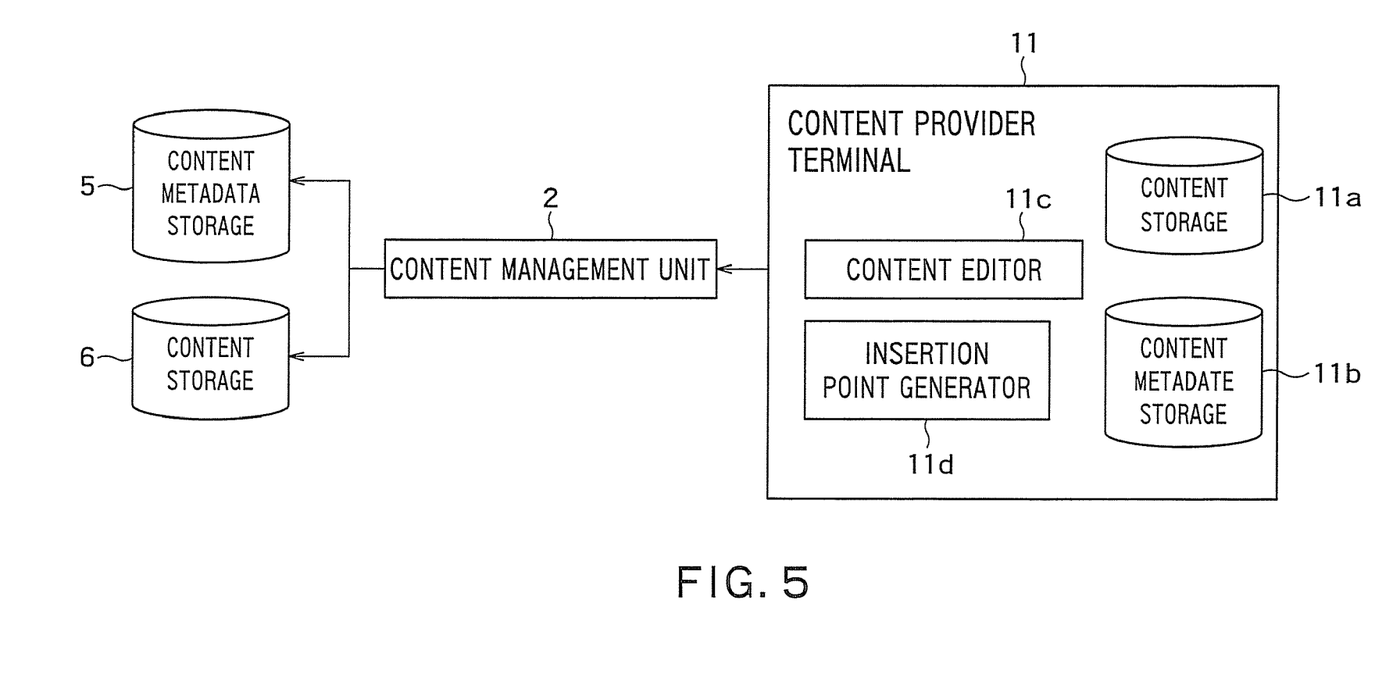
FIG. 5 is a diagram for explaining the process to acquire the content data and content metadata.

FIG. 5 shows an example to acquire and store the distribution content and content metadata.

As shown in FIG. 5, in the content provider terminal 11 operated by a broadcasting company, content production company, etc., for example, the distribution content and content metadata are produced and edited by using a contents editor 11c, and are stored in a content storage 11a and a content metadata storage 11b, respectively. When creating the content metadata, insertion point information showing commercial insertion points (the period in which the commercial can be inserted and which is expressed by the start time and ending time of the inserted commercial) is created in the distribution content by using an insertion point generator 11d, and the created insertion point information is included in the content metadata. The insertion point information has such a format as "15-15.5, 40-40.25, 70-70.25," for example. The values of this example show that the commercial image data can be inserted within the periods from 15 minutes (15) to 15 minutes and 30 seconds (15.5), from 40 minutes (40) to 40 minutes and 15 seconds (40.25), and from 70 minutes (70) to 70 minutes and 15 seconds (70.25) calculated from the start time of the distribution content (the beginning of the distribution content is determined as the start time.) That is, it is possible to insert an commercial (commercial image data) whose time length is completely corresponding to the periods of each commercial, and to insert an commercial (commercial image data) whose time length is shorter than the allowable period. For example, in the case where the commercial insertion point is determined to be "15-15.5," it is possible to insert an commercial (commercial image data) whose time length is 30 seconds or shorter. Note that it is also possible not to limit the length of the periods of the commercial to be inserted by setting the insertion point information so that only the start time of the commercial insertion is set while the ending time of the commercial insertion is not set.

The content provider terminal 11 reads the data (distribution content and content metadata) stored in the content storage 11a and the content metadata storage 11b, and transmits the data to the content management unit 2 of the content distribution device 10 through the network 9. The content management unit 2 stores the data received from the content provider terminal 12 in the content storage 6 and the content metadata storage 5.

Figure 2:
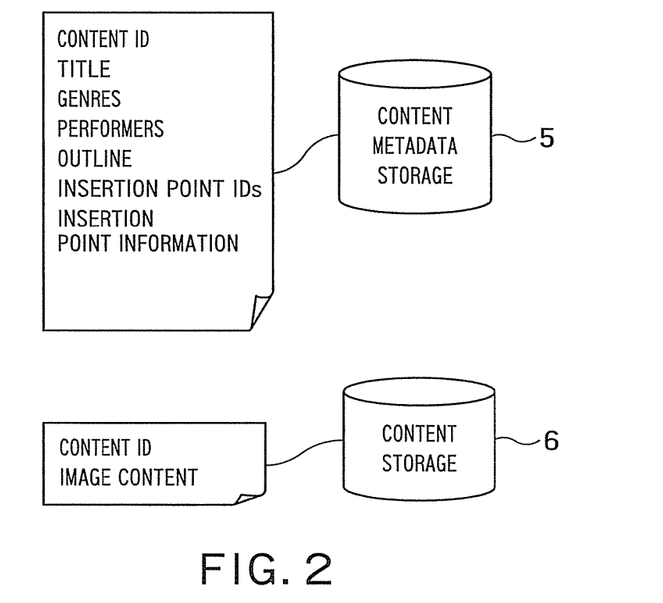
FIG. 2 is a diagram showing a structural example of the data stored in a content metadata storage and a content storage.

FIG. 2 shows an example of the data stored in the content storage 6 and the content metadata storage 5.

The content storage 6 retains the distribution content and a content ID uniquely determining the distribution content as a set.

The content metadata storage 5 retains the content ID and the metadata of the distribution content specified by the content ID as a set. The metadata includes, for example, a title, genre, performers, outline, insertion point information, and insertion point ID uniquely distinguishing the insertion point information.

The distribution content in the content storage 6 and the content metadata in the content metadata storage 5 are related to each other through the content ID.

Next, in step S2, the commercial extraction/management unit 1 receives, from the broadcasting station 12, a broadcast signal as the content data, the broadcast signal including the program content, commercial images inserted in the program content, electronic program information, and closed caption data, extracts commercial portions (commercial image data) from the program content having commercial images inserted therein, and stores the extracted commercial portions in the commercial image data storage 7. Further, the commercial extraction/management unit 1 creates the commercial metadata by using at least one of the electronic program information and the closed caption data of the content data, and stores the created commercial metadata in the commercial metadata storage 4.

More specifically, the commercial extraction/management unit 1 includes a content recorder (first receiver) 1a, an commercial extractor 1b, and an commercial management unit 1c. The explanation of the commercial management unit is omitted here and will be made later, since the commercial management unit 1c does not operate in this step and operates in another step which will be explained later. Therefore, hereinafter, the operation performed by the content recorder 1a and the commercial extractor 1b of the commercial extraction/management unit 1 will be explained in detail.

Figure 6:
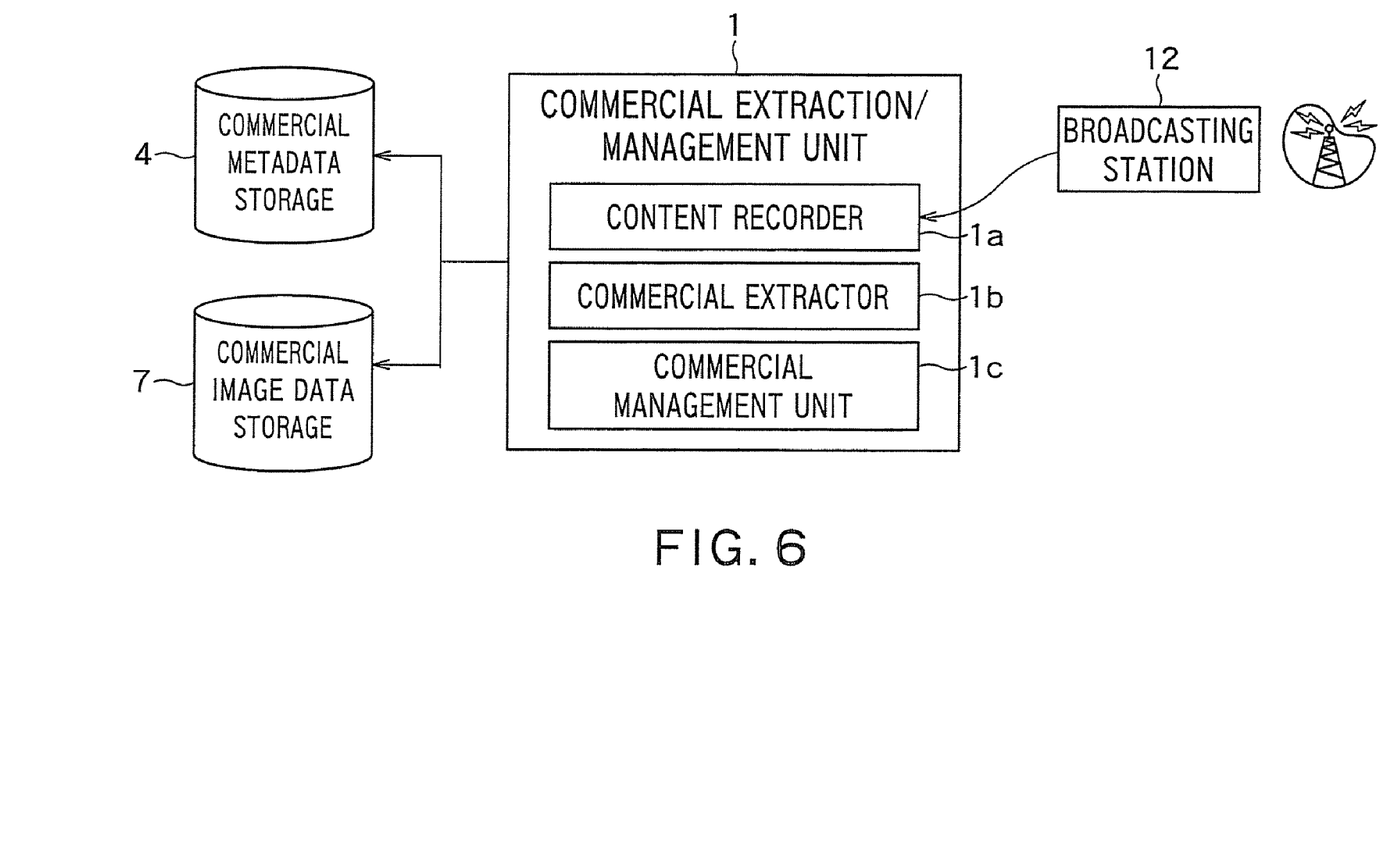
FIG. 6 is a diagram for explaining the process to acquire the commercial image data and commercial metadata.

As shown in FIG. 6, the content recorder 1a receives and records the broadcast signal (including the program content, commercial images inserted in the program content, electronic program information, and closed caption data) of the television program broadcasted by the broadcasting station 12 through radio waves as the content data.

The commercial extractor 1b extracts the commercial portions (commercial image data) from the program content having the commercial images inserted (embedded) therein, while creates the commercial metadata by using at least one of the electronic program information and the closed caption data.

Figure 7:
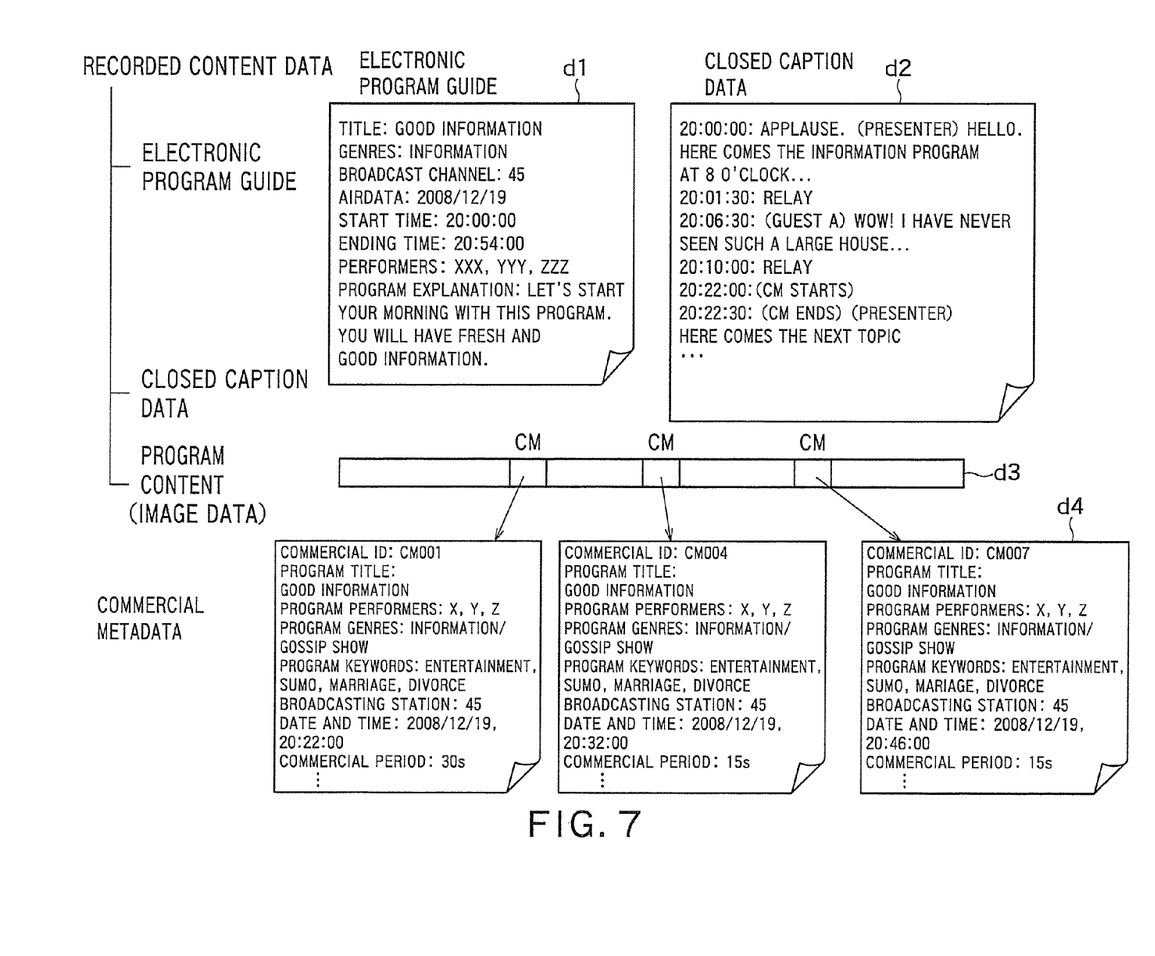
FIG. 7 is a diagram for explaining a concrete example of the process performed by an insertion commercial acquirer.

FIG. 7 is a diagram for explaining a concrete example of the operation of the commercial extractor 1b.

The extraction of the commercial image data and the creation of the commercial metadata are performed based on program content d3 having commercial images inserted (embedded) therein, electronic program information (electronic program guide) d1, and caption data d2.

The electronic program guide d1 describes the title, genre, broadcast channel, airdate, start time, ending time, performers, program explanation, etc. of the broadcast program.

The caption data d2 is represented by relating the time information to the progress information of the program and the textual information of the voice occurring from the performers etc. in the progress of the program.

The commercial extractor 1b extracts the commercial image data by using this caption data d2, for example. That is, since the start/ending time of the commercial (CM) can be specified by the caption data d2, the commercial image data can be obtained by extracting the data between the start time and the ending time from the program content d3.

Further, the commercial extractor 1b creates, based on the electronic program guide d1 and the caption data d2, commercial metadata d4 including an commercial ID (uniquely determining the commercial), commercial-inserted program title, commercial-inserted program performers, commercial-inserted program genre, commercial-inserted program keywords, commercial broadcasting station, commercial date and time (air date and time), commercial period, etc. For example, the commercial-inserted program title is acquired from the title of the electronic program guide d1, the commercial date and time (air date and time) is acquired based on the airdate of the electronic program guide d1 and the CM start time (time at which the CM starts) of the caption data d2, the commercial period is acquired by obtaining the difference between the start time and the ending time of the CM of the caption data d2, and the commercial program keywords are acquired by detecting keywords from the program explanation of the electronic program guide d1 or the caption data d2. The commercial ID is generated not to overlap with that of the other commercial metadata d4.

As stated above, the commercial extractor 1b stores the extracted commercial image data and the created commercial metadata in the commercial image data storage 7 and the commercial metadata storage 4, respectively. When the commercial image data is stored, the commercial image data is given with an commercial ID which is the same as the commercial ID of the corresponding commercial metadata.

FIG. 3 shows a structural example of the data stored in the commercial image data storage 7 and the commercial metadata storage 4.

The commercial metadata storage 4 stores the commercial metadata created by the commercial extractor 1b. The commercial metadata includes the commercial ID, commercial-inserted program title, which is the title of the program having commercials inserted therein, performers of the program, genre of the program, keywords showing the information of the program, broadcasting station (commercial broadcasting station) of the program, commercial date and time (air date and time), commercial period representing the length of the commercial, advertiser ID uniquely determining the advertiser of the program, etc.

The commercial image data storage 7 retains the commercial image data and the commercial ID of the corresponding commercial metadata as a set.

The commercial metadata in the commercial metadata storage 4 and the commercial image data in the commercial image data storage 7 are related to each other through the commercial ID. The commercial metadata storage 4 and the commercial image data storage 7 correspond to a first storage of the present invention.

In step S3 of FIG. 4, a distribution management unit 3a of the content distribution processor 3 in FIG. 1 receives the content distribution request from the viewer terminal 8. The content distribution request includes at least the content ID, and may further includes the metadata (title, genre, outline, etc.) of the distribution-requested content (see FIG. 9, which will be explained later.) The distribution management unit 3a includes a second receiver for receiving the content distribution request of the present invention. When receiving the content distribution request, the distribution management unit 3a refers to the content management unit 2 to acquire the requested distribution content and the corresponding content metadata. When receiving the reference from the distribution management unit 3a, the content management unit 2 searches the distribution content and content metadata corresponding to the referred content from the content storage 6 and the content metadata storage 5 respectively, and transmits the searched distribution content and content metadata to the distribution management unit 3a.

Figure 8:
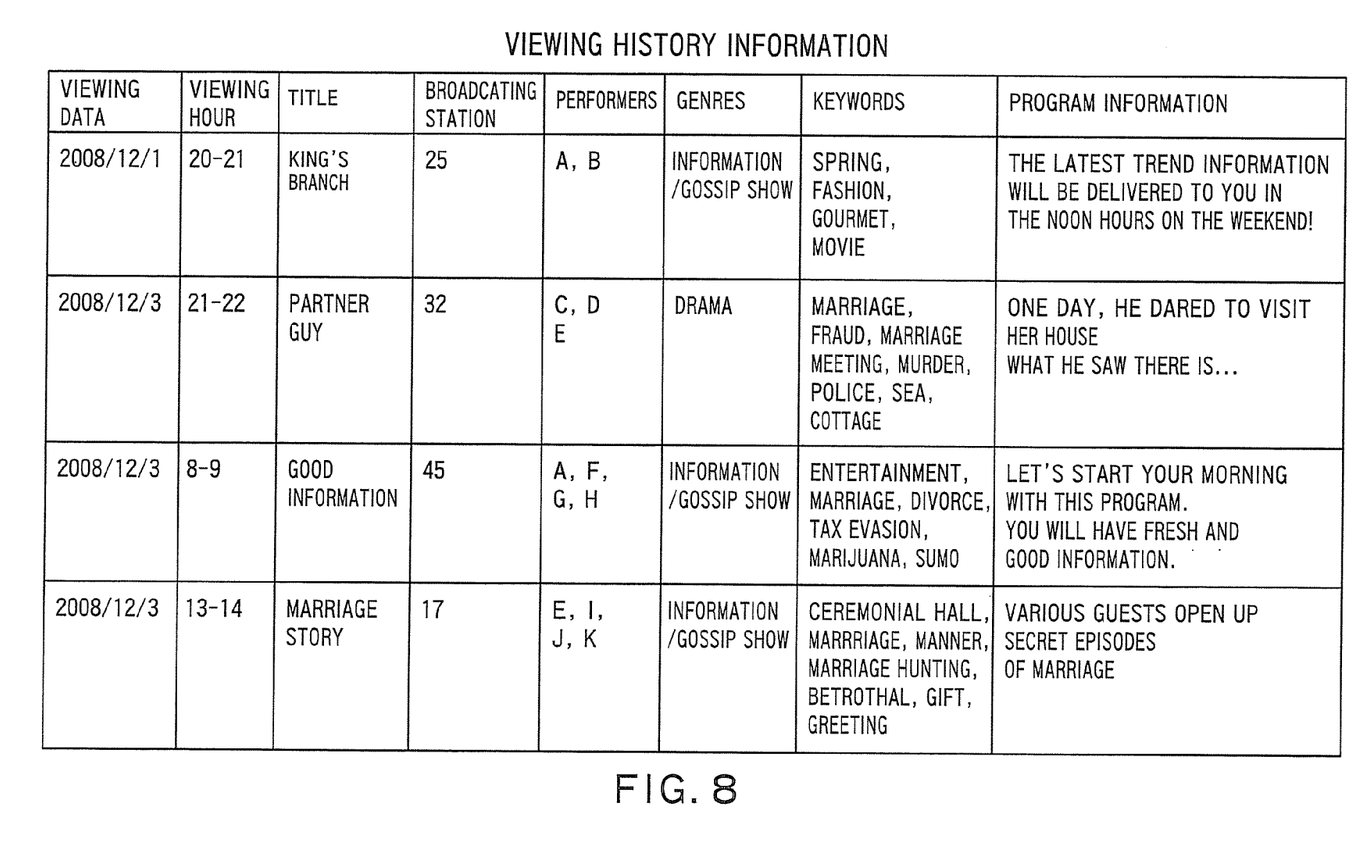
FIG. 8 is a diagram showing an example of viewing history information.

In step S4 of FIG. 4, the distribution management unit 3a of the content distribution processor 3 acquires the viewing history information of a viewer from the viewer terminal 8 through the network 9. The distribution management unit 3a corresponds to a third receiver for receiving the viewing history information of the present invention. The viewing history information shows a viewing history of the television programs (program content) viewed through the viewer terminal 8. As shown in FIG. 8, the viewing history information includes information such as viewing date, viewing hour, title of the viewed program, broadcasting station, performers, genre, keywords of the program information, program information, etc., for example. This viewing history information may further include a viewing history of the distribution content.

In step S5 of FIG. 4, an insertion commercial acquirer (commercial inserter) 3b of the content distribution processor 3 acquires the commercial (commercial image data) to be inserted in the distribution content acquired in step S3. In more detail, based on the content metadata acquired in step S3 (metadata added to the content distribution request can be used instead), the insertion commercial acquirer 3b specifies the parts (insertion point IDs and insertion point information) in the requested distribution content to insert commercials, and sets a selection condition of the commercial to be inserted with respect to each specified part. The selection condition of the commercial is set based on the viewing history information, content metadata of the requested distribution content, or data of the content distribution request, for example. When there exist a plurality of insertion points (parts in which commercials are inserted), the commercial selection condition of each part may be set to be different and may be set to be the same. In the former case, it is expected that different commercial image data is inserted in each part. The insertion commercial acquirer 3b transmits, to the commercial extraction/management unit 1, the set commercial selection condition in addition to the insertion point ID and the insertion point information. An example of how to set the commercial selection condition will be explained later.

With respect to each insertion point, the commercial management unit 1c of the commercial extraction/management unit 1 selects, from the commercial metadata storage 4, the commercial metadata matching with the commercial selection condition received from the insertion commercial acquirer 3b, and acquires, from the commercial image data storage 7, the commercial image data corresponding to the selected commercial metadata. At this time, the commercial metadata is selected which meets the commercial setting condition and has an commercial period which is equal to or shorter than the allowable commercial period shown by the insertion point information, by which commercial image data having a time length which is equal to or shorter than the allowable commercial period can be acquired. When only the start time of the commercial is set as the insertion point information, the period of the commercial to be inserted is not limited. With respect to each insertion point, the commercial extraction/management unit 1 transmits the acquired commercial image data to the content distribution processor 3.

Figure 9:
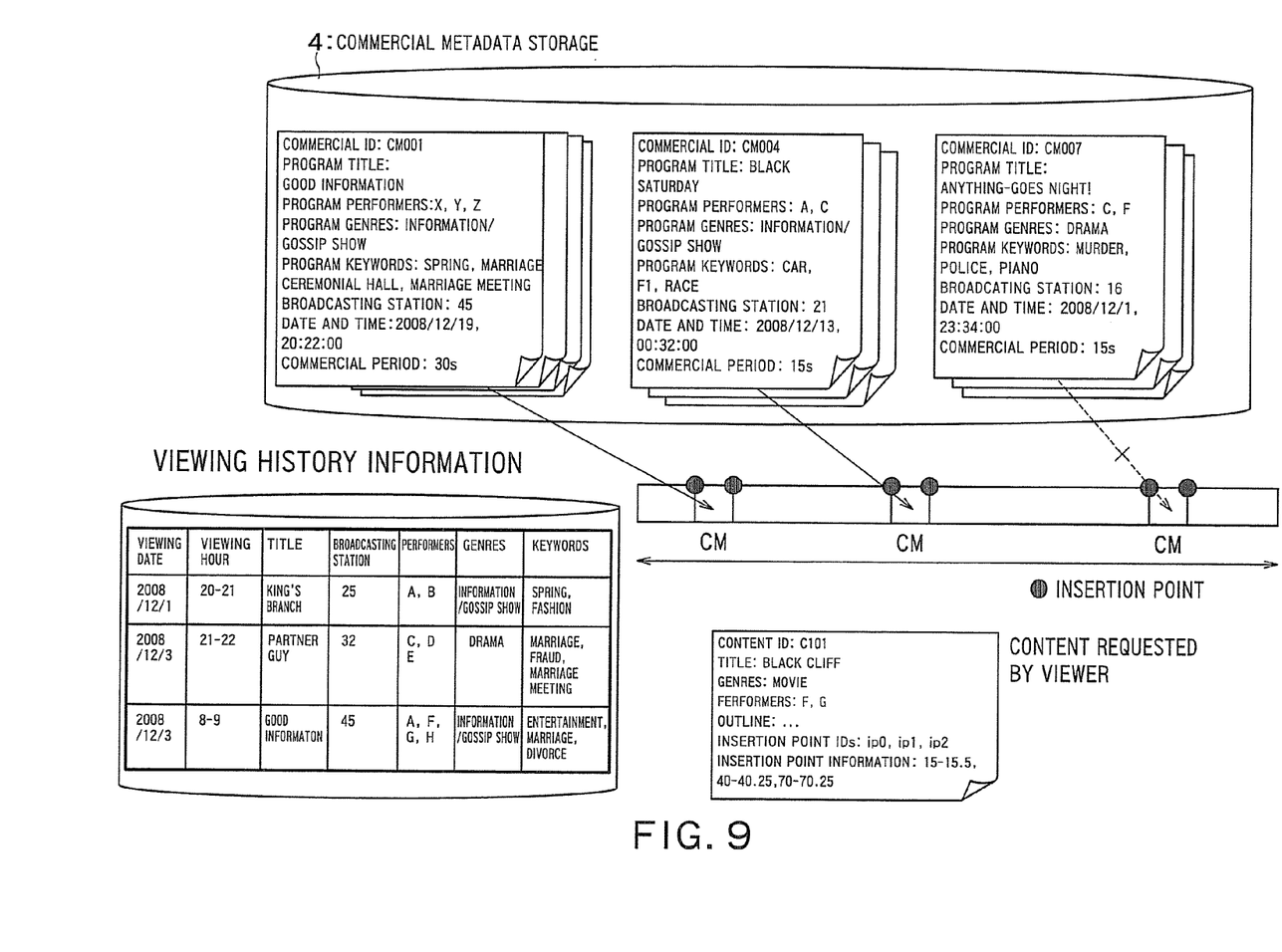
FIG. 9 is a diagram for explaining a method to insert the commercial image data.

Hereinafter, some examples of how the insertion commercial acquirer 3b sets the commercial selection condition will be shown referring to FIG. 9.

(1) The insertion commercial acquirer 3b sets the commercial selection condition based on the performers, genre, or title described in the viewing history information. In the example of FIG. 9, the performers of the distribution-requested content are F and G, which are also included in a program (title: "Good Information") in the viewing history information. This shows that the viewer tends to prefer a program in which F and G appear. Accordingly, the commercial selection condition can be set so as to select the commercial metadata having the "commercial-inserted program title" of "Good Information." That is, it is possible for the insertion commercial acquirer 3b to detect, from the viewing history information, the title of the program having performers common to the distribution-requested content if the number of the common performers is equal to or greater than a predetermined number (2 in this example), and to set the commercial selection condition so as to select the commercial metadata having the detected title as the "commercial-inserted program title."

It is also possible to detect, from the viewing history information, the title of the program having the same genre as the distribution-requested content, and to set the commercial selection condition so as to select the commercial metadata having the detected title as the "commercial-inserted program title."

When there exists the same title as the distribution-requested content in the viewing history information, the commercial selection condition can be set so as to select the commercial metadata having that title as the "commercial-inserted program title."

(2) Further, the commercial selection condition can be set based on the frequency of the performer, genre, or keyword in the viewing history information. In the example of FIG. 9, the viewing history information includes many programs concerning the genre of "information/gossip show," which shows that the viewer tends to prefer a program concerning "information/gossip show." Accordingly, the commercial selection condition can be set so as to select the commercial metadata having the commercial-inserted program genre of "information/gossip show."

Further, the keyword of "marriage" appears many times in the viewing history information, which suggests that "marriage" is a topic to the viewer's preference. Accordingly, the commercial selection condition can be set so as to select the commercial metadata having the commercial-inserted program keyword of "marriage."

Furthermore, it is considered that the viewer tends to prefer the program whose title appears most frequently in the programs included in the viewer history information. Accordingly, the commercial selection condition can be set so as to select the commercial metadata having the title of that program as the "commercial-inserted program title."

(3) When viewing the requested distribution content, the viewer is expected not to view the broadcast program provided by the broadcasting station 12. Accordingly, the commercial selection condition can be set so as to select the commercial metadata having the "commercial date and time (air date and time)" which are closer to the distribution-requested date and time. For example, it is possible to select the commercial metadata having the "commercial date and time (air date and time)" which are the closest to the distribution-requested date and time in the past or future. The distribution-requested date and time can be described in the content distribution request and the receiving date and time of the content distribution request can be treated as the distribution-requested date and time.

Further, the commercial selection condition can be set so as to select the commercial metadata having a time which is closer to the distribution-requested time as the time information (commercial time or broadcasting time) of the "commercial date and time (air date and time)." For example, the commercial selection condition can be set so as to select the commercial metadata having the time which is the closest to the distribution-requested time in the past or future as the time information (commercial time) of the "commercial date and time (air date and time)," and can be set so as to select the commercial metadata having a time within a predetermined time range with respect to the distribution-requested time as the "commercial date and time (air date and time)." The distribution-requested time can be described in the content distribution request and the receiving time of the content distribution request can be treated as the distribution-requested time.

(4) It is considered that the viewers viewing the broadcast programs each of which has the completely or partially same performers have a similar preference. Accordingly, the commercial selection condition can be set so as to select the commercial metadata having the performers who are completely or partially the same as the performers of the distribution-requested content as the "commercial-inserted program performers."

The commercial selection condition can be set to include a plurality of conditions. For example the condition based on (1) and the condition based on (3) can be included in the commercial selection condition.

Further, when there exist a plurality pieces of commercial metadata meeting the commercial selection condition, the commercial metadata can be randomly selected by narrowing down the plurality pieces of commercial metadata.

Furthermore, when there exist a plurality pieces of commercial metadata meeting the commercial selection condition, the plurality pieces of commercial metadata can be narrowed down by further adding conditions. The conditions to be added, which are previously prepared to be prioritized, can be added in the order from the highest priority until only one piece of commercial metadata meets the commercial selection condition.

In step S6, based on the insertion point ID and insertion point information, the insertion commercial acquirer 3b of the content distribution processor 3 inserts the commercial image data acquired in step S5 in the distribution content acquired in step S3. That is, the insertion commercial acquirer 3b inserts the commercial image data in each insertion point, the commercial image data being acquired corresponding to each insertion point. In step S5, the insertion commercial acquirer 3b can acquire the commercial metadata instead of the commercial image data to access the commercial image data storage based on the acquired commercial metadata so as to acquire the commercial image data corresponding to the commercial metadata.

In step S7, the distribution unit 3c distributes the distribution content having the commercial image data inserted therein to the viewer terminal 8 through the network 9. In step S6, although the insertion commercial acquirer 3b inserts the commercial image data, this process can be performed by the distribution unit 3c. Further, the content metadata acquired in step S3 is not to be transmitted to the viewer terminal 12. Note that it is also possible to transmit such data to the viewer terminal 12 so that the viewer terminal 12 can utilize the data.

As stated above, according to the present embodiment, the commercial image data is extracted from the program content televised by the broadcasting station and is stored, by which it is unnecessary to acquire the commercial image data from the terminal of the commercial agency.

Further, according to the present embodiment, the commercial image data to be inserted in the distribution content is automatically determined based on the viewing history information etc. of the viewer, by which an effective commercial reflecting the preference of the viewer can be achieved, and by which the commercial agency and advertiser need not set the conditions to insert the commercials.

Second Embodiment

Figure 10:
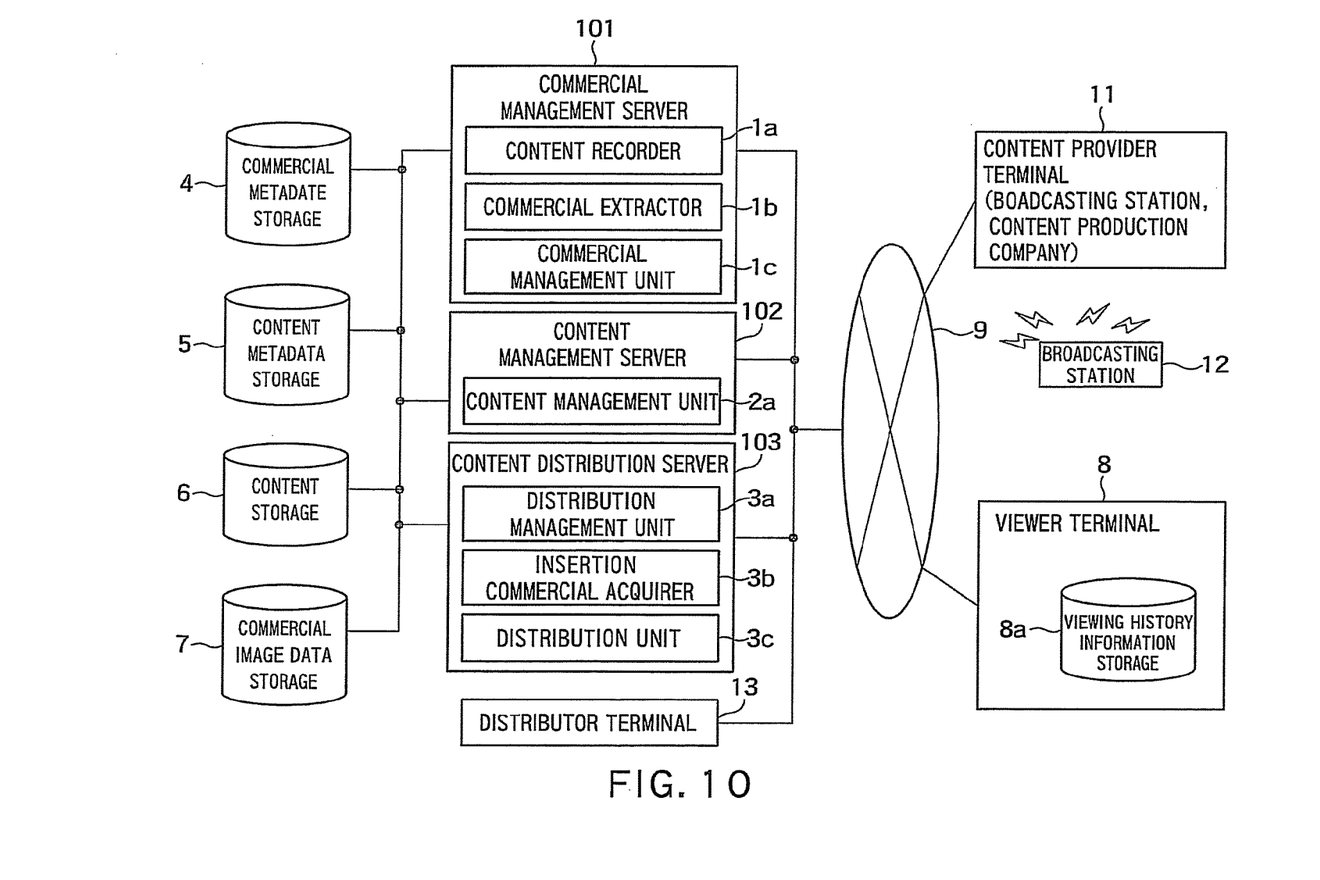
FIG. 10 is an overall block diagram showing a content distribution base including a content distribution system according to a second embodiment of the present invention.

FIG. 10 is a diagram showing a content distribution base including a content distribution system according to a second embodiment of the present invention.

In the first embodiment of FIG. 1, the content distribution device 10 is configured to include: the commercial extraction/management unit 1; the content management unit 2; the content distribution processor 3; the commercial metadata storage 4; the content metadata storage 5; the content storage 6; and the commercial image data storage 7. On the other hand, the second embodiment shows a content distribution system in which an commercial management server 101, a content management server 102, a content distribution server 103, the commercial metadata storage 4, the content metadata storage 5, the content storage 6, and the commercial image data storage 7 operate independently of one another and are connected through a local network. This content distribution system further includes a distributor terminal 13 operated by a content distributor to control the commercial management server 101, the content management server 102, and the content distribution server 103.

The commercial management server 101 includes the content recorder 1a, the commercial extractor 1b, and the commercial management unit 1c, which function similarly to the identically named elements of FIG. 1. The content management server 102 includes the content management unit 2a, which functions similarly to the identically named element of FIG. 1. The content distribution server 103 includes the distribution management unit 3a, the insertion commercial acquirer 3b, and the distribution unit 3c, which function similarly to the identically named elements of FIG. 1.

The commercial management server 101, the content management server 102, the content distribution server 103, and the distributor terminal 13 are connected to the network 9 independently of one another. The commercial management server 101 includes an antenna (not shown in the drawings) for receiving, the broadcast signal (including the program content having commercial images inserted therein, electronic program information, caption data, etc.) of the television program broadcasted by the broadcasting station 12 through radio waves.

Hereinafter, how the commercial management server 101, the content management server 102, and the content distribution server 103 operate will be explained.

In accordance with a request from the content distribution server 103, the content management unit 2a of the content management server 102 transmits, to the content distribution server 103, the distribution content and content metadata acquired from the content storage 6 and the content metadata storage 5 respectively.

The content recorder 1a of the commercial management server 101 receives and records the broadcast signal (including the program content, commercial images inserted in the program content, electronic program information, caption data, etc.) from the broadcasting station 12 as the content data. The commercial extractor 1b extracts the commercial image data from the program content having commercial images inserted therein to store the extracted commercial image data in the commercial image data storage 7, while creates the commercial metadata based on the electronic program information and caption data to store the created commercial metadata in the commercial metadata storage 4. The commercial management unit 1c selects the commercial metadata from the commercial metadata storage 4 in accordance with the commercial selection condition, insertion point ID, and insertion point information transmitted from the content distribution server 103, and selects, from the commercial image data storage 7, the commercial image data corresponding to the selected commercial metadata. Then, the commercial management unit 1c transmits the selected commercial image data to the content distribution server 103.

The distribution management unit 3a of the content distribution server 103 receives the content distribution request and viewing history information transmitted from the viewer terminal 8. The distribution management unit 3a transmits a request to the content management server 102 to acquire the distribution content and metadata corresponding to the content distribution request, and receives, from the content management server 102, the distribution content and content metadata to be distributed. The insertion commercial acquirer 3b sets the commercial selection condition based on the viewing history information etc., and transmits, to the commercial management server 101, the set commercial selection condition, insertion point ID, and insertion point information. The insertion commercial acquirer 3b receives, from the commercial management server 101, the commercial image data with respect to each insertion point. The insertion commercial acquirer 3b inserts, with respect to each insertion point, the received commercial image data in the distribution content to be distributed, and the distribution unit 3c distributes the distribution content having the commercial image data inserted therein to the viewer terminal 8 through the network 9. Although the insertion commercial acquirer 3b inserts the commercial image data, this process can be performed by the distribution unit 3c.

Third Embodiment

Figure 11:
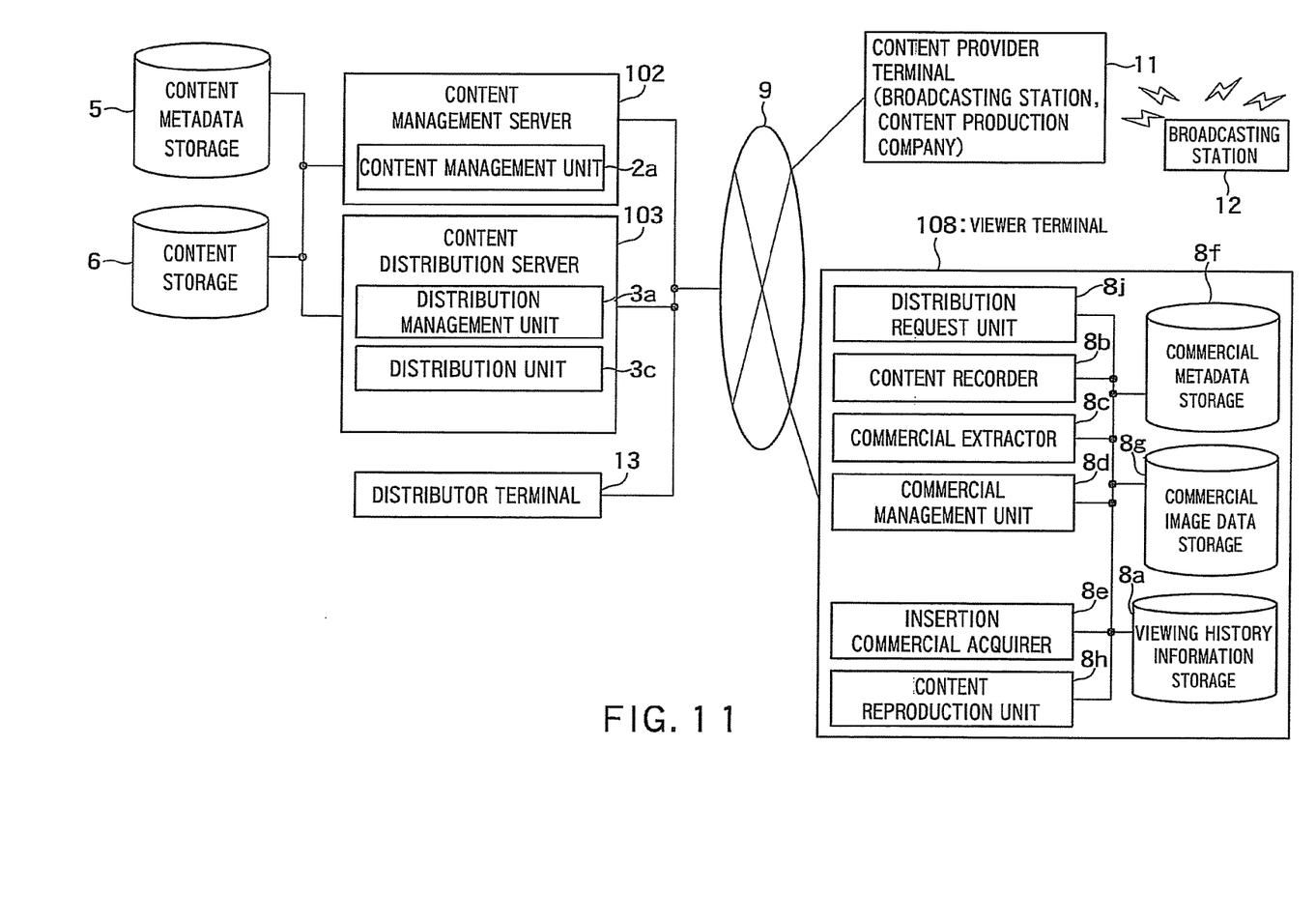
FIG. 11 is an overall block diagram showing a content distribution base including a viewer terminal according to a third embodiment of the present invention.

FIG. 11 is a diagram showing a content distribution base including a viewer terminal (content reproducing device) according to a third embodiment of the present invention.

The third embodiment is mainly different from the second embodiment in that the functions of the commercial management server, partial functions of the content distribution server (all functions of the insertion commercial acquirer and partial functions of the distribution unit), the commercial image data storage, and the commercial metadata storage are removed from the content distribution system of FIG. 10 to be incorporated in a viewer terminal 108. The other structures and processes are basically similar to those of the second embodiment.

The content distribution system of the third embodiment includes: the content management server 102; the content distribution server 103; the content metadata storage 5; and the content storage 6. The content management server 102 and the content distribution server 103 are connected to the network 9. The content management server 102 and the content distribution server 103 can communicate, through the network 9, with the content provider terminal 11 and the viewer terminal 108 respectively. Further, as in the second embodiment, the content distribution system includes the distributor terminal 13 operated by the content distributor.

As in the second embodiment, the content management server 102 includes the content management unit 2a. Further, as in the second embodiment, the content management unit 2a of the content management server 102 receives a request from the content distribution server 103, acquires the distribution content and content metadata matching with the request from the content storage 6 and the content metadata storage 5 respectively, and transmits the acquired distribution content and content metadata to the content distribution server 103.

The content distribution server 103 includes the distribution management unit 3a and the distribution unit 3c. The distribution management unit 3a receives a content distribution request transmitted from the viewer terminal 108, and transmits, to the content management server 102, a request to acquire the distribution content and content metadata matching with the distribution request. When the distribution management unit 3a receives, from the content management server 102, the distribution content to be distributed and content metadata, the distribution unit 3c distributes the distribution content and content metadata to the viewer terminal 8 as a response to the content distribution request.

The viewer terminal 108 includes: the viewing history information storage 8a; an commercial metadata storage 8f; an commercial image data storage 8g; a content recorder 8b; an commercial extractor 8c; an commercial management unit 8d; a distribution request unit 8j; an insertion commercial acquirer 8e; and a content reproduction unit 8h. The viewer terminal 108 is connected to the network 9, and can communicate with the content distribution server 103 through the network 9.

The viewing history information storage 8a stores the viewing history information of the past program content viewed through the viewer terminal (see FIG. 8). The viewing history information may include a viewing history of the distribution content. The viewer terminal 108 receives a broadcast signal (program content having commercial images inserted therein, electronic program information, etc.) of a television program broadcasted by the broadcasting station 12, and views the program content having commercial images inserted therein. Further, the viewer terminal 108 includes a viewing history creating unit for creating the viewing history information of the viewed program content by using the electronic program information. Note that the broadcast signal can be received by using the content recorder 8b, which will be explained next.

The content recorder (first receiver) 8b receives, with an antenna (not shown in the drawings), the broadcast signal of a television program transmitted by the broadcasting station 12 through broadcast waves etc., and records the data of the received broadcast signal (including the program content, commercial images inserted in the program content, electronic program information, caption data, etc.) in a buffer incorporated in the content recorder 8b.

The commercial extractor 8c extracts commercial portions from the recorded program content as the commercial image data, and stores the extracted commercial image data in the commercial image data storage 8g. Further, the commercial extractor 8c creates the commercial metadata by using at least one of the electronic program information and caption data, and stores the created commercial metadata in the commercial metadata storage 8f. The commercial image data storage 8g and the commercial metadata storage 8f correspond to the first storage of the present invention.

The commercial management unit 8d selects, from the commercial metadata storage 8f, the commercial metadata matching with each insertion point based on the commercial selection condition, insertion point ID, and insertion point information transmitted from the insertion commercial acquirer 8e, acquires, from the commercial image data storage 8g, the commercial image data corresponding to the selected commercial metadata, and transmits the acquired commercial image data to the insertion commercial acquirer 8e.

The distribution request unit 8j transmits a content distribution request to the content distribution server 103 through the network 9, and receives, from server 103, the distribution content and content metadata matching with the request.

The insertion commercial acquirer (commercial inserter) 8e sets the commercial selection condition based on the viewing history information in the viewing history information storage 8a. The commercial selection condition can be set by using the content metadata and the data of the content distribution request. The insertion commercial acquirer 8e transmits, to the commercial management unit 8d, the set commercial selection condition, insertion point ID, and insertion point information, and acquires, from the commercial management unit 8d, the commercial image data of each insertion point. With respect to each insertion point, the insertion commercial acquirer 8e inserts the acquired commercial image data in the distribution content acquired by the distribution request unit 8j. Note that the insertion commercial acquirer 8e can receive, from the commercial management unit 8d, the commercial metadata instead of the commercial image data to acquire the commercial image data corresponding to this commercial metadata by accessing the commercial image data storage 8g by itself.

The content reproduction unit 8h reproduces the distribution content having the commercial image data inserted therein. In this way, it is possible to let the viewer view the distribution content (image content) in which commercials are properly inserted.

What is claimed is:

1. A content distribution device for communicating, through a network, with a viewer terminal which views program content having commercial image data inserted therein, the program content broadcasted by a broadcasting station, comprising:

a first receiver configured to receive a broadcast signal from the broadcasting station, the broadcast signal including the program content and electronic program information, the program content having a commercial image data inserted therein;

a commercial extractor configured to extract the commercial image data from the program content and create, based on the electronic program information, commercial metadata including a performer, genre, and title of the program content;

a first storage configured to store the commercial image data and the commercial metadata that are associated with each other;

a second storage configured to store distribution contents each of which is image content to be distributed to the viewer terminal through the network;

a second receiver configured to receive a content distribution request from the viewer terminal;

a content selector configured to select the distribution content specified by the content distribution request from the second storage;

a third receiver configured to receive, from the viewer terminal, viewing history information of the viewer terminal, the viewing history information including a performer, genre, and title of program contents which have been viewed through the viewer terminal;

a commercial inserter configured to select the commercial metadata from the first storage based on the viewing history information and insert the commercial image data corresponding to the selected commercial metadata in the distribution content selected by the content selector; and a distribution unit configured to distribute the distribution content having the commercial image data inserted therein to the viewer terminal.

2. The device according to claim 1, wherein the commercial inserter specifies at least one performer, at least one genre, or at least one title based on appearance frequency of each of the performers, the genres, or the titles included in the viewing history information, and selects the commercial metadata including a specified performer, genre, or title.

3. The device according to claim 1, wherein the commercial inserter specifies a title of a program content having a performer common to the distribution content specified by the content distribution request and selects the commercial metadata including the title.

4. The device according to claim 1, wherein
the electronic program information includes detail description of the program content,
the broadcast signal includes caption data describing textual information of voice used in the program content, the commercial extractor detects a keyword from at least one of the detail description of the program content and the caption data, and includes the keyword in the commercial metadata, the viewing history information includes keywords relating to the program contents which have been viewed through the viewer terminal, and the commercial inserter specifies one or more keywords based on appearance frequencies of each keyword included in the viewing history information, and selects the commercial metadata including the one or more keywords.

5. The device according to claim 1, wherein the broadcast signal includes caption data which includes progress schedule of the program content, the electronic program information includes an airdate of the program content, the commercial extractor detects air date and time of the commercial image data based on the electronic program information and the caption data, and includes the air date and time in the commercial metadata, and the commercial inserter selects the commercial metadata in which the air date and time are close to date and time of the content distribution request, or the commercial metadata in which the time of the air date and time is close to the time of the content distribution request.

6. The device according to claim 1, wherein the broadcast signal includes caption data which includes progress schedule of the program content, and the commercial extractor detects commercial start time and commercial ending time based on the caption data, and extracts data between the commercial start time and the commercial ending time in the program content as the commercial image data.

7. A viewer terminal which views program content having commercial image data inserted therein serving as a broadcast program broadcasted by a broadcasting station and creates and accumulates viewing history information including a performer, genre, and title of program contents which have been viewed;
 a first receiver configured to receive a broadcast signal from the broadcasting station, the broadcast signal including the program content having the commercial image data inserted therein and electronic program information of the program content;
 a commercial extractor configured to extract the commercial image data from the program content and create commercial metadata including a performer, genre, and title of the program content based on the electronic program information;
 a first storage configured to store the commercial image data and the commercial metadata that are associated with each other;
 a distribution request unit configured to transmit a content distribution request via a network to a content delivery device configured to manage distribution of distribution contents each of which is image content to be distributed through the network and obtain the distribution content specified by the content distribution request from the content delivery device;
 a commercial inserter configured to select the commercial metadata from the first storage based on the viewing history information and inserts the commercial image data corresponding to the selected commercial metadata in the distribution content obtained by the distribution request unit; and
 a content reproduction unit configured to reproduce the distribution content having the commercial image data inserted therein.

8. A content distribution method executed by a computer which communicates, through a network, with a viewer terminal which views program content having commercial image data inserted therein, the program content serving as a broadcast program broadcasted by a broadcasting station, comprising:
 receiving a broadcast signal from the broadcasting station, the broadcast signal including the program content having the commercial image data inserted therein and electronic program information of the program content;
 extracting the commercial image data from the program content, creating commercial metadata including a performer, genre, and title of the program content based on the electronic program information, and storing the commercial image data and the commercial metadata by relating these data to each other in a first storage;
 receiving a content distribution request from the viewer terminal;
 a content selector configured to select a distribution content specified by the content distribution request from a second storage configured to store distribution contents each of which is image content to be distributed to the viewer terminal through the network;
 receiving, from the viewer terminal, viewing history information of the viewer terminal, the viewing history information including a performer, genre, and title of program contents which have been viewed through the viewer terminal;
 selecting the commercial metadata from the first storage based on the viewing history information and inserting the commercial image data corresponding to the selected commercial metadata in the distribution content selected; and
 distributing the distribution content having the commercial image data inserted therein to the viewer terminal.

9. A content reproduction method executed by a viewer terminal which views program content having commercial image data inserted therein serving as a broadcast program broadcasted by a broadcasting station and creates and accumulates viewing history information including a performer, genre, and title of program contents which have been viewed;
 receiving a broadcast signal from the broadcasting station, the broadcast signal including the program content having the commercial image data inserted therein and electronic program information of the program content;
 extracting the commercial image data from the program content, creating commercial metadata including a performer, genre, and title of the program content based on the electronic program information, and storing the commercial image data and the commercial metadata by relating these data to each other in a first storage;
 transmitting a content distribution request via a network to a content delivery device configured to manage distribution of distribution contents each of which is image content to be distributed through the network and obtaining the distribution content specified by the content distribution request from the content delivery device;
 selecting the commercial metadata from the first storage based on the viewing history information and inserting the commercial image data corresponding to the selected commercial metadata in the distribution content obtained; and
 reproducing the distribution content having the commercial image data inserted therein.

* * * * *